United States Patent [19]
Smith

[11] 3,759,016
[45] Sept. 18, 1973

[54] CENTRIFUGAL SEPARATORS

[75] Inventor: Allen Smith, Newcastle-upon-Tyne, England

[73] Assignee: Reyrolle Parsons Limited, Durham, England

[22] Filed: Feb. 9, 1972

[21] Appl. No.: 224,811

Related U.S. Application Data

[63] Continuation-in-part of Ser. No. 850,172, Aug. 14, 1969, abandoned.

[30] Foreign Application Priority Data
Aug. 21, 1968 Great Britain.................. 40,050/68

[52] U.S. Cl.................................. 55/452, 55/457
[51] Int. Cl............................................ B01d 45/12
[58] Field of Search.............. 55/452–457, 347, 348

[56] References Cited
UNITED STATES PATENTS
2,425,588  8/1947  Alexander............................. 55/452
3,251,176  5/1966  Gleason............................... 55/457

FOREIGN PATENTS OR APPLICATIONS
901,290  7/1962  Great Britain........................ 55/452
328,122  4/1930  Great Britain........................ 55/457
   359   4/1886  Sweden................................ 55/456

*Primary Examiner*—Bernard Nozick
*Attorney*—John C. Holman et al.

[57]     ABSTRACT

A centrifugal separator for separating liquid particles from a gas comprising a tubular member, means for imparting swirl to the gas as it enters the member, the member having elongated slots in its wall which slots extend in a generally axial direction of the member such that they lie transversely across the path of the gas in the region of the member, the edges of the walls defining the slots being aligned so as to provide a substantially smooth surface to the passage of the gas within the member.

6 Claims, 2 Drawing Figures

3,759,016

CENTRIFUGAL SEPARATORS

This application is a continuation-in-part of my earlier U.S. Pat. application Ser. No. 850,172 filed Aug. 14, 1969, and entitled "Improvements in and relating to Centrifugal Separators," now abandoned.

BACKGROUND OF THE INVENTION

This invention relates to centrifugal separators and is particularly though not exclusively concerned with the application of such separators for the separation of water from steam.

As work is extracted from initially saturated steam in a turbine, a proportion of the latest heat is released which causes water to condense within the steam which may reach such proportions than an unacceptable loss in power and blade erosion results. In order to avoid these difficulties, the steam containing condensed droplets of water may be removed from the turbine through an opening in the casing or from a duct connecting two turbines and passed to a steam separator. These separators, because of large volumetric flow rates, can be of the centrifugal type which impart swirl to the steam and the condensed droplets, because of their greater density, are flung by centrifugal action to the outer wall of the separator. The water collecting on the outer wall of the separator is removed and may be returned to, say, the condenser while the steam is returned to the turbine or the interconnecting duct between turbines for further expansion.

One of the problems associated with highly rated centrifugal separators is the problem of re-entrainment of the water droplets collecting on the outer wall of the separator by the steam.

PRIOR ART

Various louvred walls have been proposed in which the walls had sections which overlapped one another but were in spaced relation when they overlapped to form a tangential passage through which the water could pass. In some instances such arrangements are effective in that the overlapping edges serve to guide de-entrained water into an outer annulus where it can be drained without the risk of re-entrainment by the steam.

In some instances, however, where the steam wetness is high as, for example, with steam turbines operating on saturated steam from a boiling water reactor, and where the size of the separator is large, the number of louvres required needs to be large.

It has been found that as the number of louvres increases the efficiency of water separation falls off and research has shown that this is due at least in part to local flow disturbances in the region of the louvres wiich result in the water forming in pools on the walls in front of the drainage passages. The formation of pools results in the water being re-entrained by the steam.

SUMMARY OF THE INVENTION

The present invention consists in a centrifugal separator for separating liquid particles from a gas and comprises : a tubular member, means for imparting swirl to the gas as it enters the member, the member having elongated slots in its wall slots extend in a generally axial direction of the member such that they lie transversely across the path of the gas in the region of the member, the edges of the walls defining the slots being aligned so as to provide a substantially smooth surface to the passage of the gas within the member.

The invention also consists in a centrifugal separator substantially as described below with reference to the accompanying drawings in which :

BRIEF DESCRIPTION OF THE INVENTION

FIG. 1 is a section through a centrifugal separator in accordance with one form of the invention ; and FIG. 2 is a section through part of the casing of the separator of FIG. 1.

DETAILED DESCRIPTION OF THE INVENTION

Figure 1:
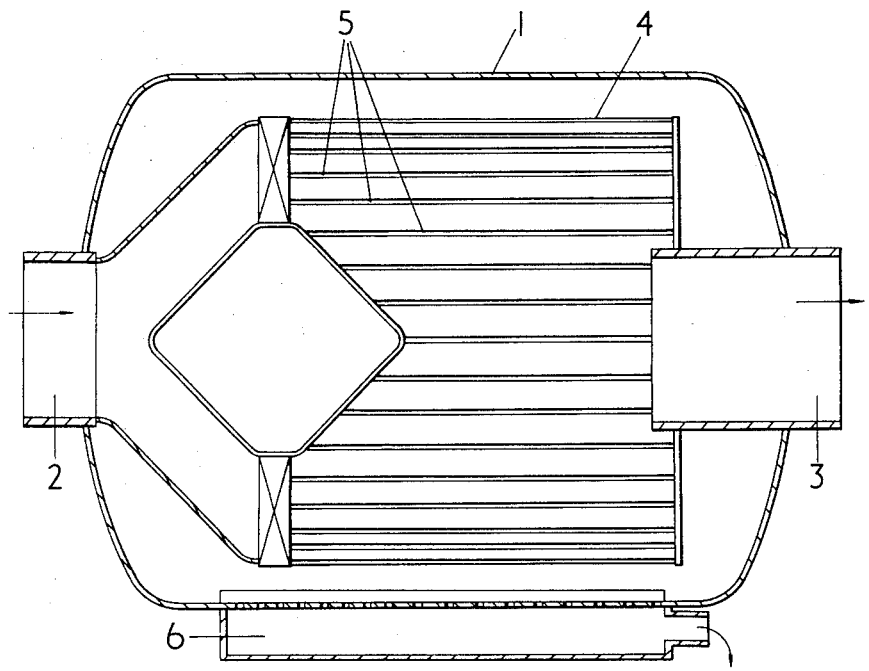

In carrying the invention into effect in the form illustrated by way of example a centrifugal separator for separation of water from steam in a steam turbine plant comprises a casing 1 having an inlet 2 and outlet 3 for steam. Within the casing is a tubular member 4 at the inlet to which is a vaned device 4a of conventional form to impart swirl to the steam.

Figure 2:
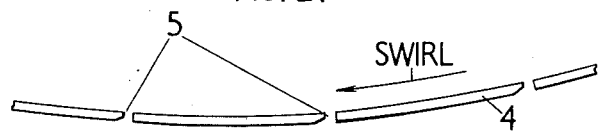

The tubular member has axially extending, elongated slots 5 formed in its wall and, as shown in FIG. 2, the edges of the wall defining the slots are aligned so as to provide a substantially smooth inner surface, that is to say, the longitudinal edges of all the slots lie in a common cylindrical surface.

The steam follows a spiral path through the member and consequently the slots are disposed transversely with respect to the direction of steam flow in the region of the wall of member 4. While the slots as shown extend in a direction parallel to the axis of the member this is not essential. The criterion is that the slots should be transverse to the direction of flow of the films of deposited water which flow towards them on the inter-slot surfaces of the wall. The slots may therefore, extend in a generally axial direction without being strictly parallel to the axis of the member.

A water collection chamber 6 is provided to collect water passing through the slots.

By arranging that the inner wall of member 4 is substantially smooth with no protrusions of the edges defining the slots into the path of the steam, local disturbances encountered with the conventional louvred configuration are avoided and it has been found that there is less re-entrainment of water. The water film formed by collected droplets which flows toward each slot is found to be drawn into the slot using the arrangement described, being carried around the leading longitudinal edge in the direction of the film flow by an effect, the theoretical expansion for which remains uncertain. It is believed that the effect is due in the main, however, to surface tension in the film of water formed as described hereinbefore.

In some circumstances it is beneficial to shape one of the edges defining each slot to reduce the risk of rebound of droplets from the blunt trailing edges. This shaping of the edges is shown at 5a in FIG. 2.

I claim:

1. A centrifugal separator for separating liquid particles from a gas, comprising: as tubular member provided with a gas inlet at one end thereof and a gas outlet at the other end; a casing having an inlet and an outlet for gas, the tubular member, being housed in the casing, the inlet and outlet of the tubular member being connected to the inlet and outlet of the casing, and at least one liquid outlet in the casing: and means within the tubular member disposed adjacent said inlet of the tubular member imparting a swirl to the gas, the improvement comprising the tubular member being provided with elongated spaced apart slots, which extend substantially parallel to the tubular member axis and for substantially the entire length of the tubular member about the periphery thereof, the longitudinal inner edges of the slots lying on a common surface of revolution which also defines the inner surface of the tubular member; said means imparting a swirl to the gas having a radius substantially equal to the radial dimension of the tubular member; and, the slot-ends situated nearest the gas inlet end of the tubular member being disposed directly adjacent to said swirl imparting means.

2. The centrifugal separator according to claim 1, which includes a water collection chamber located beneath said at least one casing and connected to said liquid outlet to collect water passing through said slots.

3. The centrifugal separator according to claim 1, wherein each slot is defined by leading and trailing wall edges, one of said edges defining each slot being shaped to reduce the risk of rebound of droplets from said trailing edges.

4. The centrifugal separator as claimed in claim 1, wherein each said slot includes a strip of surface forming at least part of one of its longitudinal sides and disposed at an acute angle to a plane which is radial to the tubular member and contains a longitudinal edge of the respective slot, to reduce any risk of droplets of said liquid from rebouncing and re-entraining the gas flow.

5. A centrifugal separator for separating liquid droplets from a gas, comprising a tubular member provided with a gas inlet at one end thereof and a gas outlet at the other end, a casing housing the tubular member, said casing having an inlet and an outlet for gas and at least one liquid outlet, the inlet and outlet of the tubular member being connected to the inlet and outlet of the casing, and means withing the tubular member disposed adjacent said inlet of the tubular member for imparting a swirl to the gas, said swirl imparting means having a radius substantially equal to the radial dimension of the tubular member, the tubular member having a row of elongated slots extending from directly adjacent to said swirl imparting means for substantially the entire length of the tubular member about the periphery thereof, the longitudinal inner edges of the slots lying on a common surface of revolution which also contains the inter-slot inner wall surface of the tubular memberm upon which surface, films of liquid are formed by collection of the liquid droplets, the longitudinal direction of the slots being disposed transverse to the direction of flow of the films under the influence of said gas swirl.

6. The centrifugal separator according to claim 5, wherein the slots are arranged so that the films of liquid are drawn into the slots, being carried around the leading longitudinal edge of each slot.

* * * * *